United States Patent
Kitano et al.

(10) Patent No.: US 6,835,160 B2
(45) Date of Patent: Dec. 28, 2004

(54) CONTROL DEVICE FOR HYBRID VEHICLE

(75) Inventors: Kazuhiko Kitano, Kawachi-gun (JP); Kazuhisa Yamamoto, Utsunomiya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/340,829

(22) Filed: Jan. 13, 2003

(65) Prior Publication Data

US 2003/0153428 A1 Aug. 14, 2003

(30) Foreign Application Priority Data

Jan. 15, 2002 (JP) ........................................ 2002-006686

(51) Int. Cl.$^7$ .......................... B60K 41/02; B60D 11/00; B60D 11/02
(52) U.S. Cl. .............................. 477/5; 477/3; 180/65.2; 180/65.4
(58) Field of Search ........................... 477/3, 5; 475/2; 180/65.4, 65.2, 65.3

(56) References Cited

U.S. PATENT DOCUMENTS

| | | | | |
|---|---|---|---|---|
| 5,801,499 A | * | 9/1998 | Tsuzuki et al. | 180/65.2 |
| 6,183,389 B1 | * | 2/2001 | Tabata | 477/5 |
| 6,517,464 B2 | * | 2/2003 | Yamazaki et al. | 477/5 |
| 6,595,895 B2 | * | 7/2003 | Suzuki et al. | 477/3 |
| 2002/0058565 A1 | * | 5/2002 | Yamamoto et al. | 477/5 |
| 2002/0061803 A1 | * | 5/2002 | Aoki | 477/3 |
| 2002/0091034 A1 | * | 7/2002 | Nakamori et al. | 477/3 |

FOREIGN PATENT DOCUMENTS

| | | |
|---|---|---|
| JP | 08-099564 | 4/1996 |
| JP | 10-339182 | 12/1998 |
| JP | 2000-152407 | 5/2000 |
| JP | 2000-170903 | 6/2000 |
| JP | 2000-320581 | 11/2000 |
| JP | 2000-324608 | 11/2000 |
| JP | 2001-082204 | 3/2001 |
| JP | 2001-173768 | 6/2001 |

OTHER PUBLICATIONS

Notice of Reasons for Rejection dated Jul. 14, 2003 in corresponding Japanese Patent Application No. 2002–006686 with English translation.

* cited by examiner

Primary Examiner—Tisha Lewis
(74) Attorney, Agent, or Firm—Armstrong, Kratz, Quintos, Hanson & Brooks, LLP (57) ABSTRACT

A control device for a hybrid vehicle is described which enables preventing a decrease in the efficiency of regeneration even when the revolution rate of an internal combustion engine is decreased during deceleration of the vehicle. The control device for a hybrid vehicle comprises an internal combustion engine and a motor connected in series with respect to each other, a torque converter which is connected to the rotational axis of the motor and which is provided with a lockup clutch, a transmission, a mechanical oil pump producing oil pressure for controllably operating the torque converter and the transmission, a motor-driven oil pump producing oil pressure for controllably operating the lockup clutch, and an ECU. The ECU operates the motor-driven oil pump depending on the deceleration state of the vehicle, and sets the lockup clutch in an engaged state. A method for operating the concerned control device is also described.

6 Claims, 7 Drawing Sheets

CONTROL DEVICE FOR HYBRID VEHICLE

BACKGROUND OF THE INVENTION

1. Field of the Invention

The present invention relates to a control device for a hybrid vehicle having an engine and a motor for outputting driving power, and in particular, the present invention relates to a control device incorporating a control technique which controls a lockup clutch provided to a torque converter during regenerative operation of the motor when the vehicle decelerates.

2. Description of the Related Art

As in a control device for an engine and a motor-generator disclosed in Japanese Unexamined Patent Application, First Publication No. 2000-324608, or as in a control device for a vehicle disclosed in Japanese Unexamined Patent Application, First Publication No. 2001-173768, a control device for a vehicle, e.g., for a hybrid vehicle having not only an internal combustion engine but also an electric motor as the drive source, in which the output power of the internal combustion engine or of the motor is transmitted to a transmission via a torque converter comprising a lockup clutch, which controls not only a mechanical oil pump providing oil pressure to the transmission, the torque converter, or the like, but also controls a motor-driven oil pump, has been known in the art.

In such a control device for a vehicle, the motor-driven oil pump is driven by electrical power supplied from a battery device when the internal combustion engine or the motor for driving the mechanical oil pump is in a stopped state, and the motor-driven oil pump is constructed so as to provide oil pressure to the transmission, the torque converter, or the like, when, for example, the vehicle is going to move.

In a conventional control device for a vehicle as mentioned above, because the motor is disposed at an upstream position with respect to the torque converter, driving power is transmitted to the motor from the wheels of the vehicle via the torque converter when the kinetic energy of the vehicle is restored as regenerated electrical energy by the motor during, for example, deceleration of the vehicle.

In such a regenerative operation of the motor, the lockup clutch of the torque converter is maintained in an engaged state so that the torque loss in the torque converter is restrained, and so that the kinetic energy of the vehicle can be effectively restored.

However, when, for example, the revolution rate of the internal combustion engine is lower than a certain value, the discharging pressure of the mechanical pump is decreased, and because the engaging pressure of the lockup clutch in the engaged state is decreased, the torque transmitted via the lockup clutch may be reduced. As a result, the regenerated energy generated by the motor may also be reduced, or even the regenerative operation of the motor may not be performed.

SUMMARY OF THE INVENTION

In consideration of the above circumstances, an object of the present invention is to provide a control device for a hybrid vehicle which enables preventing a decrease in the efficiency of regeneration even when the revolution rate of the internal combustion engine is decreased during deceleration of the vehicle.

In order to solve the above problems and to achieve the above object, the present invention provides a control device for a hybrid vehicle comprising: a transmitting section connecting at least one of an internal combustion engine and a motor to drive wheels via a torque converter having a lockup clutch; a motor-driven pump producing oil pressure for operating the lockup clutch; and a regenerative operation control section which, when the vehicle decelerates, operates the motor-driven oil pump so as to set the lockup clutch in a lockup state, and which also operates the motor so as to generate regenerated energy.

According to the above control device for a hybrid vehicle, when the vehicle decelerates, the regenerative operation control section operates the motor-driven oil pump so as to produce hydraulic pressure for operating the lockup clutch so that torque transmission loss in the torque converter during torque transmission from the drive wheels to the motor is reduced; therefore, the efficiency of regeneration can be improved.

A control device of the present invention may further comprise another oil pump which operates in synchronization with the input revolution rate of the torque converter, and which produces oil pressure for operating the lockup clutch, a determining section determining whether the discharging pressure of the oil pump is equal to or less than a predetermined value, wherein the regenerative operation control section operates the motor-driven oil pump when it is determined by the determining section that the discharging pressure of the oil pump is equal to or less than the predetermined value.

According to the above control device, even when the discharge pressure of the oil pump is decreased due to, for example, decrease in the revolution rate of the internal combustion engine during deceleration of the vehicle, the regenerative operation control section operates the motor-driven oil pump when it is determined by the determining section that the discharging pressure of the oil pump is equal to or less than a predetermined value.

Accordingly, for example, even when it is difficult to operate the lockup clutch using the oil pressure produced by the oil pump, the regenerative operation control section can controllably operate the lockup clutch using the oil pressure produced by the motor-driven oil pump; therefore, the efficiency of regeneration can be improved.

Furthermore, in the control device of the present invention, the determining section may determine whether the discharging pressure of the oil pump is equal to or less than a predetermined value by determining whether the revolution rate of the oil pump is equal to or less than a predetermined revolution rate.

According to the above control device, the determining section makes a determination regarding the discharging pressure of the oil pressure based on the revolution rate of the oil pump, or, for example, based on the input revolution rate of the torque converter. In this case, for example, a revolution rate measuring sensor for the internal combustion engine may be used to measure the input revolution rate of the torque converter; therefore, it is possible to measure the discharging pressure of the oil pump without further providing, for example, an oil pressure sensor.

In addition, the control device of the present invention may further comprise a threshold changing section which changes the predetermined revolution rate in accordance with the temperature of the operation oil for operating the lockup clutch.

According to the above control device, the threshold changing section changes the predetermined revolution rate, which is used as a determination threshold in the determining section, in accordance with the temperature of the operation oil. For example, when the temperature of the operation oil is relatively high, it is determined that the discharging pressure of the oil pump will be decreased, and the predetermined revolution rate is set to a higher value so that the motor-driven oil pump properly operates. On the other hand, when the temperature of the operation oil is relatively low, it is determined that a decrease in the discharging pressure of the oil pump is small, and the predetermined revolution rate is set to a lower value.

Accordingly, the motor-driven oil pump can be effectively operated; therefore, the efficiency of regeneration can be improved even when, for example, vehicle speed is low, or the temperature of the operation oil is high.

DESCRIPTION OF THE PREFERRED EMBODIMENTS

An embodiment of the control device according to the present invention will be explained below with reference to the appended drawings.

Figure 1:
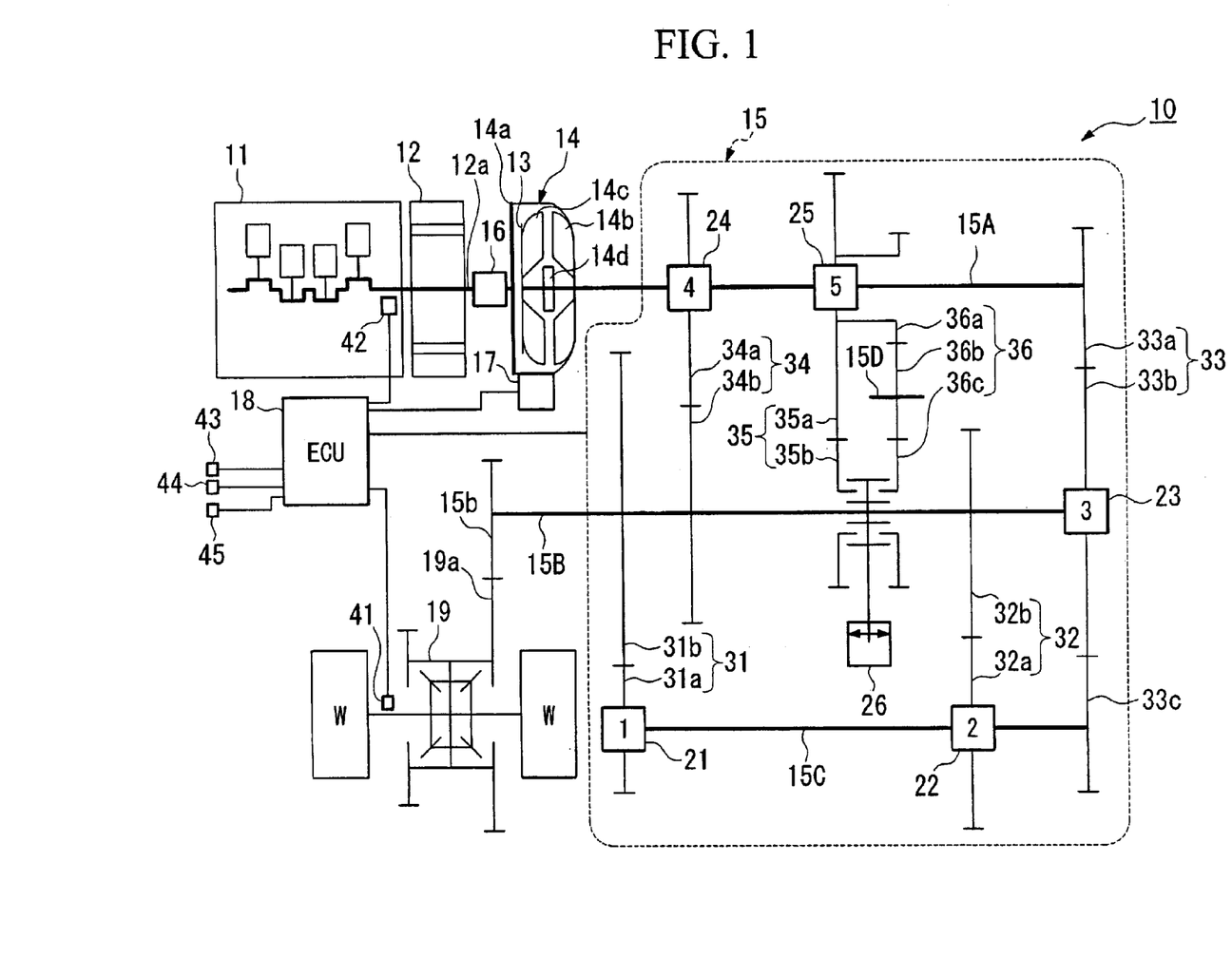
FIG. 1 is a block diagram showing the main part of the general structure of a hybrid vehicle having a control device for a hybrid vehicle in an embodiment according to the present invention.

FIG. 1 is a block diagram showing the main part of the general structure of a hybrid vehicle having the control device 10 for a hybrid vehicle in an embodiment according to the present invention.

The control device 10 for a hybrid vehicle in this embodiment transmits the driving power of at least one of an internal combustion engine 11 and a motor 12 to the drive wheels of the vehicle via a torque converter 14 provided with a lockup clutch 13 and via a transmission 15, and the control device 10 comprises the internal combustion engine 11 and the motor 12 connected in series with respect to each other, the torque converter 14 connected to the rotational axis 12a of the motor 12, the transmission 15, a mechanical oil pump 16 producing oil pressure for controllably operating the torque converter 14 and the transmission 15, a motor-driven pump 17 producing oil pressure for controllably operating the lockup clutch 13, and an ECU 18.

The torque converter 14 transmits torque using fluid, and the torque converter 14 comprises a pump impeller 14b integrated with a front cover 14a connected to the rotational axis 12a of the motor 12, a turbine runner 14c disposed between the front cover 14a and the pump impeller 14b so as to face the pump impeller 14b, and a stator 14d disposed between the pump impeller 14b and the turbine runner 14c.

Furthermore, a lockup clutch 13 is disposed between the turbine runner 14c and the front cover 14a so as to be pressed against the inner surface of the front cover 14a and so as to be able to engage the front cover 14a.

In addition, operation oil (ATF: Automatic Transmission Fluid) is filled in a chamber formed by the front cover 14a and the pump impeller 14b.

When the pump impeller 14b rotates along with the front cover 14a in a state in which the lockup clutch 13 is disengaged, the helical flow of the operation oil is produced, which makes the turbine runner 14c produce rotational driving power; thus, torque is transmitted via the operation oil.

On the other hand, when the lockup clutch 13 is in an engaged state, rotational driving power is directly transmitted from the front cover 14a to the turbine runner 14c without the operation oil intervening.

Note that because the engaging state of the lockup clutch 13 is set to be variable, the rotational driving power transmitted from the front cover 14a to the turbine runner 14c via the lockup clutch 13 can be arbitrarily set.

The transmission 15 is an automatic transmission of the type in which each of synchro clutches 21 to 26 is operated by, for example, the ECU 18 so that gear change operation is controllably executed.

Note that a connecting gear 15b integrated with the output shaft 15B of the transmission 15 is provided so as to continuously mesh with the gear 19a of a differential device 19 which distributes driving force to the right and left drive wheels W and W, respectively.

The transmission 15 comprises, for example, an input shaft 15A which is a main shaft, an output shaft 15B which is a counter shaft, a drive shaft 15C, a reverse gear axis 15D, forward first to fifth gear pairs 31 to 35, each of which has a different gear ratio from other pairs, and a reverse gear train 36. The input shaft 15A, the output shaft 15B, the drive shaft 15C, and the reverse gear shaft 15D are disposed in parallel with respect to each other.

The forward first and second gear pairs 31 and 32 comprise forward first and second drive gears 31a and 32a mounted on the drive shaft 15C, and forward first and second output gears 31b and 32b mounted on the output shaft 15B. The gears 31a and 31b forming a gear pair, and the gears 32a and 32b forming another gear pair continuously mesh with each other.

The forward first output gear 31b and forward second output gear 32b are integrated with the output shaft 15B. The forward first drive gear 31a paired with the forward first output gear 31b, and the forward second drive gear 32a paired with the forward second output gear 32b are constructed as idle gears which are rotatable with respect to the drive shaft 15C, and which are selectively engaged or disengaged with respect to the drive shaft 15C by means of first and second synchro clutches 21 and 22, respectively.

The forward third to fifth gear pairs 33 to 35 comprise forward third to fifth input gears 33a to 35a mounted on the input shaft 15A, forward third to fifth output gears 33b to 35b mounted on the output shaft 15B. The gears 33a and 33b forming a gear pair, and the gears 35a and 35b forming another gear pair continuously mesh with each other.

Furthermore, the drive shaft 15C is provided with a drive gear 33 which is paired with the forward third output gear 33b and which continuously meshes therewith.

The reverse gear train 36 comprises a reverse input gear 36a mounted on the input shaft 15A, a reverse drive gear 36b mounted on the reverse gear drive shaft 15D, and a reverse output gear 36c mounted on the output shaft 15B. The gears 36a and 36b forming a gear pair, and the gears 36b and 36c forming another gear pair continuously mesh with each other.

The forward third input gear 33a integrated with the input shaft 15A and forward third output gear 33b meshing with the drive gear 33c integrated with the drive shaft 15C are constructed as idle gears which are rotatable with respect to the output shaft 15B, and which are selectively engaged or disengaged with respect to the output shaft 15B by means of a third synchro clutch 23.

The forward fourth input gear 34a paired with the forward fourth output gear 34b integrated with the output shaft 15B is constructed as an idle gear which is rotatable with respect to the input shaft 15A, and which is selectively engaged or disengaged with respect to the input shaft 15A by means of a fourth synchro clutch 24.

The forward fifth input gear 35a and the reverse input gear 36a are constructed as idle gears which are rotatable with respect to the input shaft 15A. The forward fifth output gear 35b and the reverse output gear 36b are constructed as idle gears which are rotatable with respect to the output shaft 15B, and the reverse gear 36b is integrated with the reverse gear shaft 15D.

The forward fifth input gear 35a and the reverse input gear 36a are selectively engaged or disengaged with respect to the input shaft 15A by means of a fifth synchro clutch 25.

Furthermore, one of the forward fifth output gear 35b and the reverse output gear 36b is selectively engaged or disengaged with respect to the output shaft 15B by means of a synchro clutch 26.

More specifically, the input shaft 15A and the drive shaft 15C are continuously connected by means of forward the third gear pair 33 and the drive gear 33c, and when one of the first to fourth gear positions is selected, the input shaft 15A and drive shaft 15C and the output shaft 15B are connected by means of one of the synchro clutches 21 to 24.

In addition, when the fifth gear position is selected, the forward fifth input gear 35a and the reverse input gear 36a are connected to the input shaft 15A by means of the fifth synchro clutch 25, and also the forward fifth output gear 35b is selected by the synchro clutch 26, and is connected to the output shaft 15B.

On the other hand, when the reverse position is selected, the forward fifth input gear 35a and the reverse input gear 36a are connected to the input shaft 15A by means of the fifth synchro clutch 25, and also the reverse output gear 36c is selected by the synchro clutch 26, and is connected to the output shaft 15B.

The oil pump 16 is disposed, for example, between the internal combustion engine 11 and the motor 12 which are directly connected in series with respect to each other, and the torque converter 13, and is operable in synchronization with the input revolution rate of the torque converter 13. The oil pump 16 is operated by the output of the internal combustion engine 11 when the motor 12 is operated in a regenerative mode, or the motor 12 is stopped.

The motor-driven oil pump 17 is operated by electrical power supplied by a battery device (not shown).

The ECU 18 controls the shift operation of the transmission 15 by operating each of the actuators 21 to 26 depending on, for example, the shift operation input by the driver, or depending on the driving state of the vehicle.

Furthermore, the ECU 18 also controls the operation of the motor-driven oil pump 17 depending on the deceleration state of the vehicle, which will be explained below.

In order to execute various control operations, the ECU 18 is provided various signals such as a signal output from a vehicle speed sensor 41 which measures vehicle speed V based on the rotational speed of the drive wheels W, a signal output from a revolution rate sensor 42 which measures the revolution rate of the internal combustion engine II (engine revolution rate) NE, a signal from a brake switch 43 which detects operation of the brake pedal, a signal from an accelerator pedal opening degree sensor 44, and a signal from an oil temperature sensor 45 which measures the temperature of the operation oil (the temperature of the transmission oil) TATF.

The control device 10 for a hybrid vehicle in this embodiment is constructed as explained above. Next, the operation of the control device 10 for a hybrid vehicle, specifically, the operation for controlling the motor-driven oil pump 17 will be explained below with reference to the appended drawings.

Figure 2:
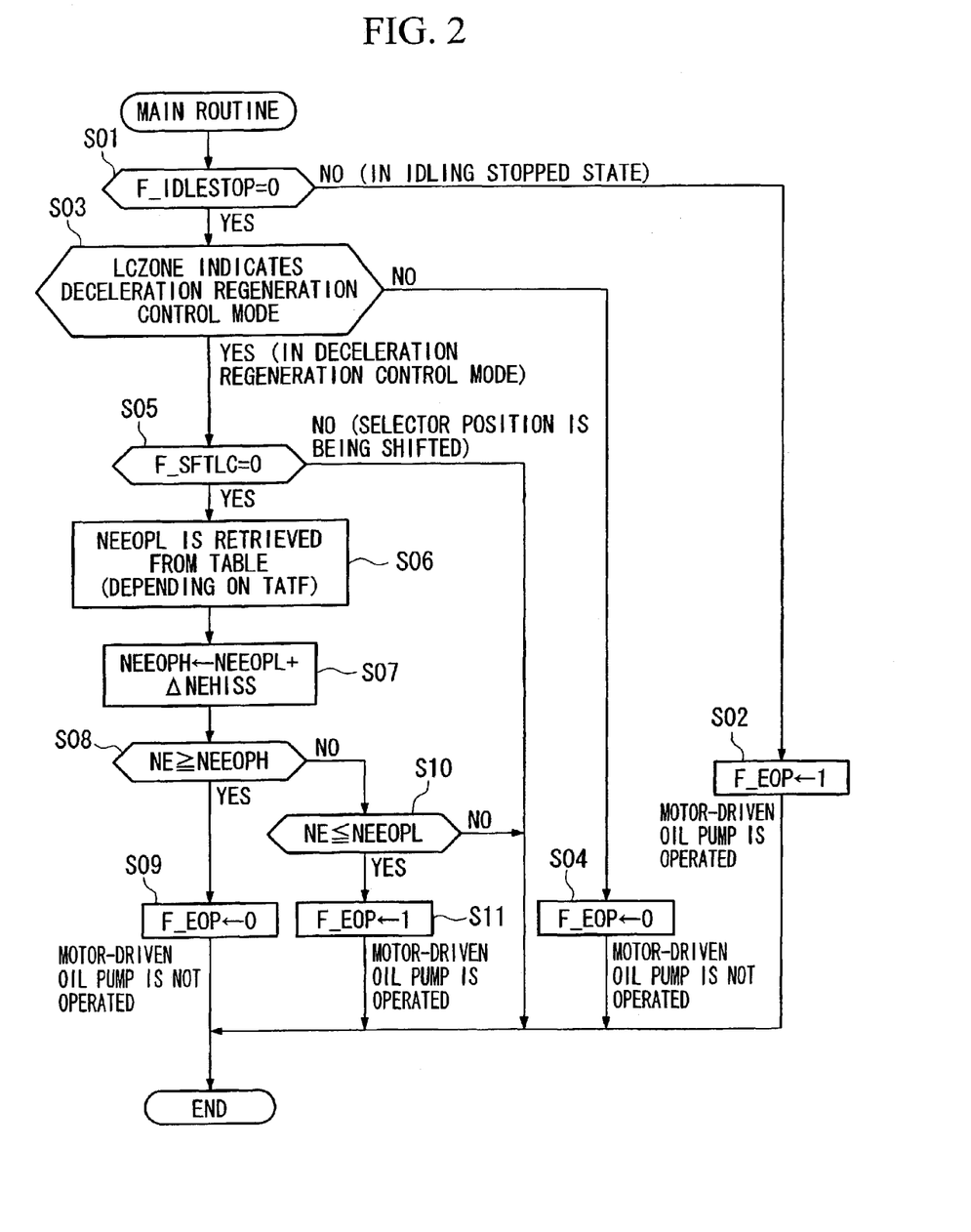
FIG. 2 is a flowchart showing the operation of the control device for a hybrid vehicle, in particular, showing the operation for setting a motor-driven oil pump operation command flag F_EOP.
Figure 3:
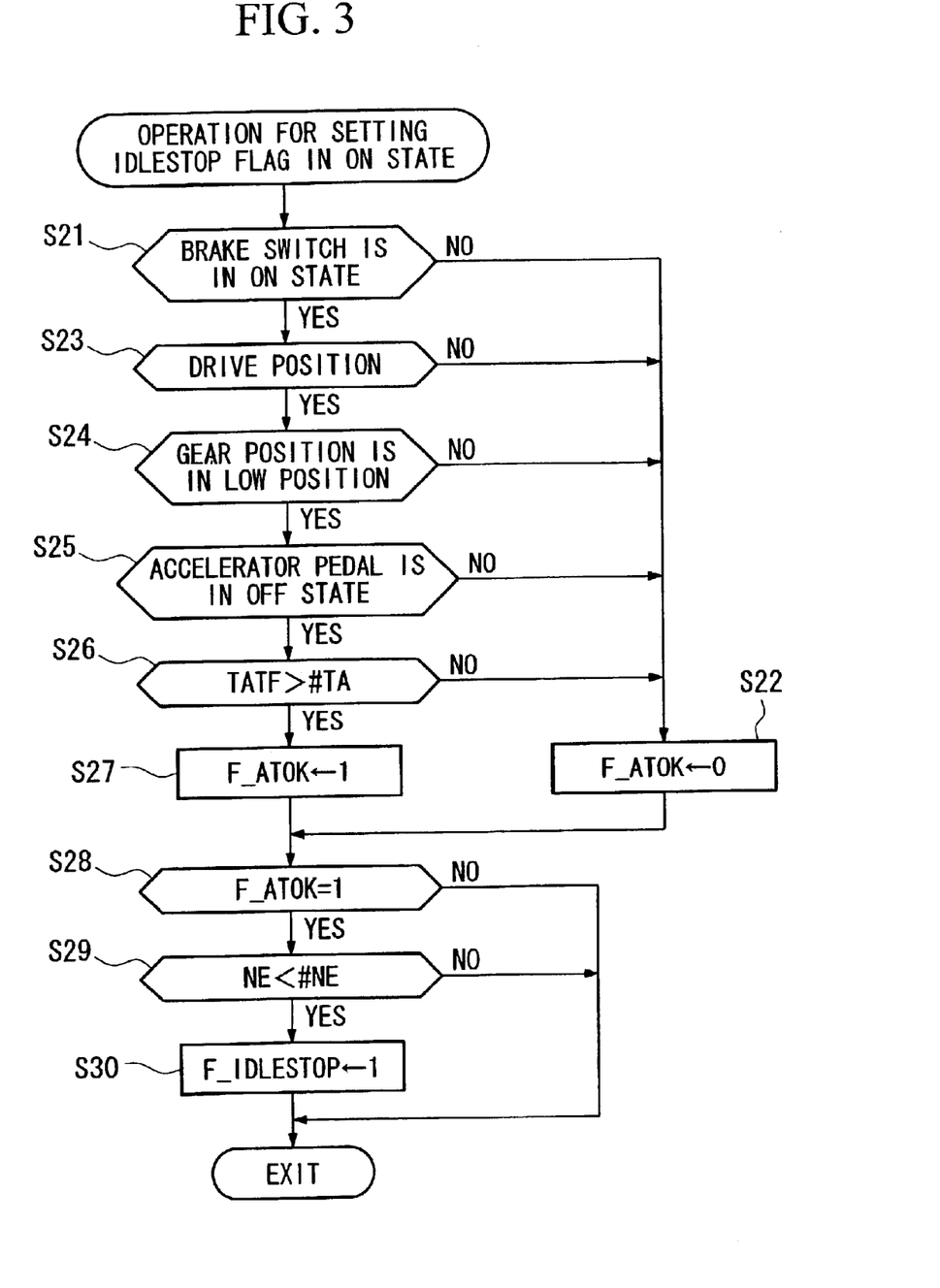
FIG. 3 is a flowchart showing the operation for setting "1" to an idling stop flag F_IDLESTOP shown in FIG. 2.
Figure 4:
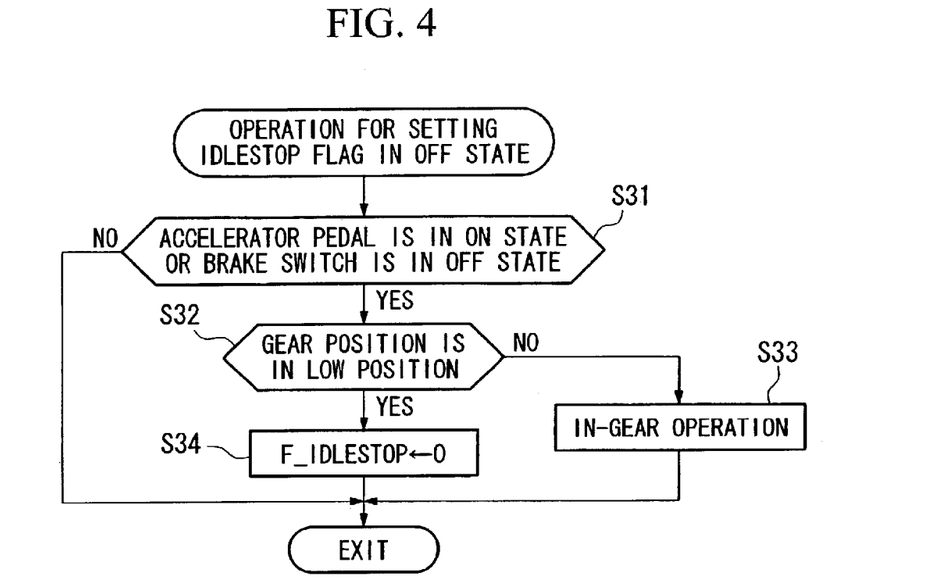
FIG. 4 is a flowchart showing the operation for setting "0" to the idling stop flag F_IDLESTOP shown in FIG. 2.
Figure 5:
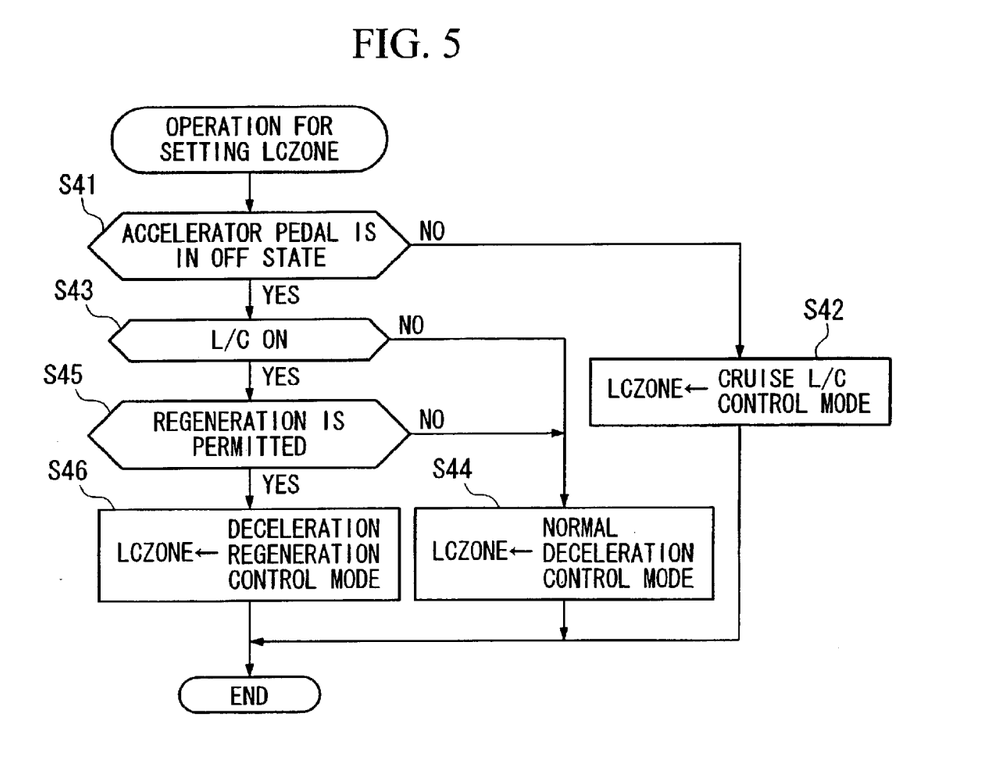
FIG. 5 is a flowchart showing the operation for determining a lockup clutch control state LCZONE shown in FIG. 2.
Figure 6:
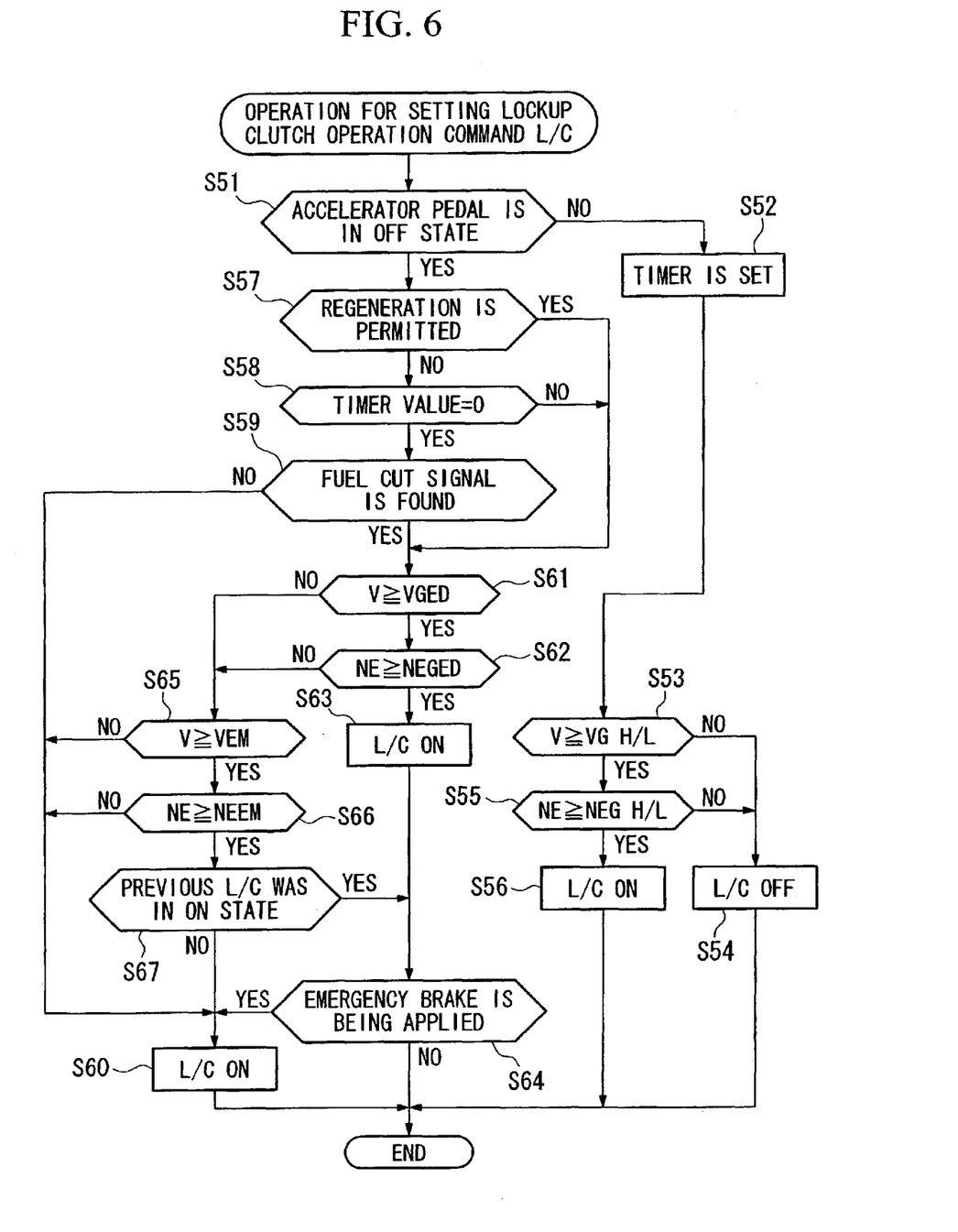
FIG. 6 is a flowchart showing the operation for determining a lockup clutch operation command L/C shown in FIG. 5.
Figure 7:
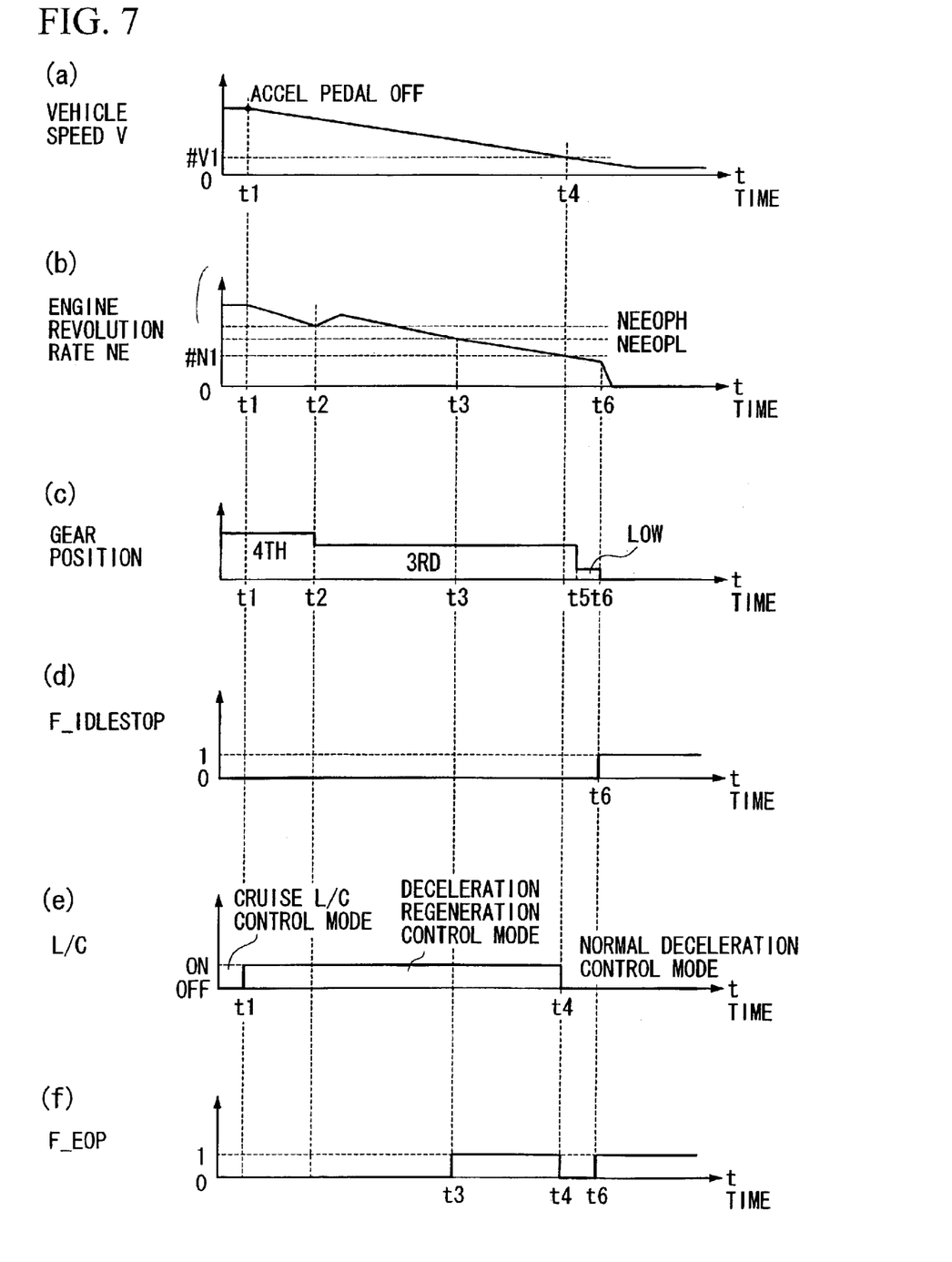
FIG. 7 is a graph, in which parts (a) to (f) respectively show examples of changes in a vehicle speed V, an engine revolution rate NE, gear positions, the idling stop flag F_IDLESTOP, the lockup clutch control state LCZONE, the lockup clutch operation command L/C, and the motor-driven oil pump operation command flag F_EOP.
Figure 8:
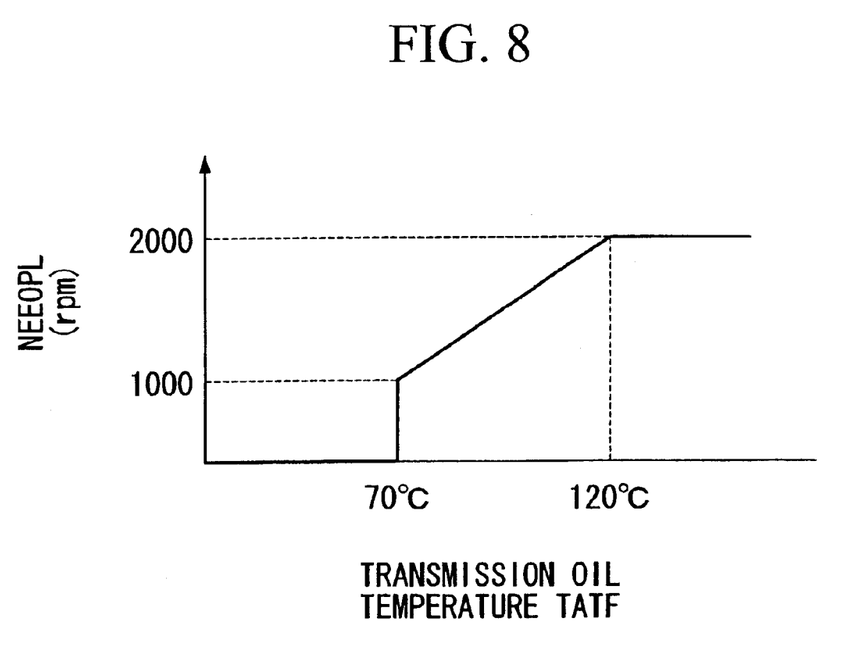
FIG. 8 is a graph showing a change in the lowest engine revolution rate for the motor-driven oil pump operation NEEOPL which changes depending on the temperature of the operation oil (the temperature of the transmission oil) TATF.

FIG. 2 is a flowchart showing the operation of the control device 10 for a hybrid vehicle, in particular, showing the operation for setting the motor-driven oil pump operation command flag F_EOP, FIG. 3 is a flowchart showing the operation for setting "1" to the idling stop flag F_IDLESTOP shown in FIG. 2, FIG. 4 is a flowchart showing the operation for setting "0" to the idling stop flag F_IDLESTOP shown in FIG. 2, FIG. 5 is a flowchart showing the operation for determining the lockup clutch control state LCZONE shown in FIG. 2, FIG. 6 is a flowchart showing the operation for determining the lockup clutch operation command L/C shown in FIG. 5, FIG. 7 is a graph, in which parts (a) to (f) respectively showing examples of changes in the vehicle speed V, the engine revolution rate NE, the gear positions, the idling stop flag F_IDLESTOP, the lockup clutch control state LCZONE, the lockup clutch operation command L/C, and the motor-driven oil pump operation command flag F_EOP, and FIG. 8 is a graph showing a change in the lowest engine revolution rate for the motor-driven oil pump operation NEEOPL which changes depending on the temperature of the operation oil (the temperature of the transmission oil) TATF.

First, in step S01 shown in FIG. 2, it is determined whether the value of the idling stop flag F_IDLESTOP, which will be explained below, is "0".

When the result of the determination is "NO", which means that the internal combustion engine 11 is in an idling stopped state, the operation proceeds to step S02, in which the value of the motor-driven oil pump operation command flag F_EOP is set to "1", and then the series of operations is terminated.

In contrast, when the result of the determination is "YES", the operation proceeds to step S03.

In step S03, it is determined whether or not a deceleration regeneration control mode is set in the lockup clutch control state LCZONE which indicates the control state of the lockup clutch 13, which will be explained below.

When the result of the determination is "NO", which means that the deceleration regeneration control mode is not set, the operation proceeds to step S04, in which the value of the motor-driven oil pump operation command flag F_EOP is set to "0", and then the series of operations is terminated.

In contrast, when the result of the determination is "YES", the operation proceeds to step S05.

In step S05, it is determined whether the value of a position shift flag F_SFTLC, which indicates that the selector position is being shifted by the shift operation of the driver, is "0".

When the result of the determination is "NO", which means that the selector position is being shifted, the series of operations is terminated.

In contrast, when the result of the determination is "YES", the operation proceeds to step S06.

In step S06, the lowest engine revolution rate for the motor-driven oil pump operation NEEOPL is retrieved and selected from a table, which is, for example, shown in FIG. 8, depending on the temperature of the operation oil (ATF) TATF.

Note that the lowest engine revolution rate for the motor-driven oil pump operation NEEOPL is an engine revolution rate below which the mechanical oil pump 16 driven by the internal combustion engine 11 cannot produce a sufficient oil pressure to set the lockup clutch 13 in a completely engaged state.

In this table, in a predetermined range of the temperature of the transmission oil TATF (e.g., 70° C.≦TATF≦120° C.), the lowest engine revolution rate for the motor-driven oil pump operation NEEOPL is set so as to increase, in accordance with an increase in the temperature of the transmission oil TATF, from the lowest revolution rate (e.g., 1000 rpm) to the highest revolution rate (e.g., 2000 rpm).

In other words, the lowest engine revolution rate for the motor-driven oil pump operation NEEOPL is set so that the motor-driven pump 17 operates below a relatively high engine revolution rate NE when the discharging pressure of the mechanical pump 16 is decreased because the temperature of the transmission oil TATF is high, and the lowest engine revolution rate for the motor-driven oil pump operation NEEOPL is set so that the motor-driven pump 17 operates below a relatively low engine revolution rate NE when a decrease in the discharging pressure of the mechanical pump 16 is relatively small because the temperature of the transmission oil TATF is low.

In step S07, a value, which is obtained by adding a predetermined engine revolution rate hysteresis ΔNEHISS (e.g., 100 rpm) to the lowest engine revolution rate for the motor-driven oil pump operation NEEOPL, is set as the highest engine revolution rate for the motor-driven oil pump operation NEEOPH.

Next, in step S08, it is determined whether or not the engine revolution rate NE is equal to or greater than the highest engine revolution rate for the motor-driven oil pump operation NEEOPH.

When the result of the determination is "YES", the operation proceeds to step S09, in which a flag value "0" is set to the motor-driven oil pump operation command flag F_EOP, and the series of operations is terminated.

In contrast, when the result of the determination is "NO", the operation proceeds to step S10, in which it is determined whether or not the engine revolution rate NE is equal to or lower than the lowest engine revolution rate for the motor-driven oil pump operation NEEOPL.

When the result of the determination in step S10 is "NO", the series of operations is terminated.

In contrast, when the result of the determination in step S10 is "YES", the operation proceeds to step S11, in which a flag value "1" is set to the motor-driven oil pump operation command flag F_EOP, and the series of operations is terminated.

The operation for setting a flag value "1" to the idling stop flag F_IDLESTOP, to which a determination is made in step S01 explained above, will be explained below.

First, in step S21 shown in FIG. 3, it is determined whether the brake switch (brake SW) 43 is in the ON state.

When the result of the determination is "NO", the operation proceeds to step S22, in which a flag value "0" is set to an AT preparation completion flag F_ATOK which indicates that a preparation has been completed, and the operation proceeds to step S28, which will be explained below.

In contrast, when the result of the determination is "YES", the operation proceeds to step S23, in which it is determined whether the selector position selected by the driver is in the D (drive) position.

When the result of the determination in step S23 is "NO", the operation proceeds to step S22 explained above.

In contrast, when the result of the determination is "YES", the operation proceeds to step S24, in which it is determined whether the gear position is in the LOW position.

When the result of the determination in step S24 is "NO", the operation proceeds to step S22 explained above.

In contrast, when the result of the determination in step S24 is "YES", the operation proceeds to step S25, in which it is determined whether the accelerator pedal is in the OFF state (e.g., whether the opening degree of the accelerator pedal is zero).

When the result of the determination in step S25 is "NO", the operation proceeds to step S22 explained above.

In contrast, when the result of the determination in step S25 is "YES", the operation proceeds to step S26, in which it is determined whether the temperature of the transmission oil TATF is higher than a predetermined oil temperature #TA.

When the result of the determination in step S26 is "NO", the operation proceeds to step S22 explained above.

In contrast, when the result of the determination in step S26 is "YES", the operation proceeds to step S27, in which a flag value "1" is set to the AT preparation completion flag F_ATOK, and the operation proceeds to step S28.

In step S28, it is determined whether the value of the AT preparation completion flag F_ATOK is "1".

When the result of the determination is "NO", the series of operations is terminated.

In contrast, when the result of the determination is "YES", the operation proceeds to step S29, in which it is determined whether the engine revolution rate NE is lower than a predetermined revolution rate #NE.

When the result of the determination in step S29 is "NO", the series of operations is terminated.

In contrast, when the result of the determination in step S29 is "YES", the operation proceeds to step S30, in which a flag value "1" is set to the idling stop flag F_IDLESTOP, and the series of operations is terminated.

In other words, it is determined, in the automatic transmission side, whether or not a preparation for idling stop has been completed based on the state of the brake switch 43, the gear position, the selector position, the opening degree of the accelerator pedal, and the temperature of the transmission oil TATF, and furthermore, when the conditions for idling stop are satisfied in the internal combustion engine 11 side based on the engine revolution rate NE, the idling stop operation is executed.

The operation for setting a flag value "0" to the idling stop flag F_IDLESTOP, to which a determination is made in step S01 explained above, will be explained below.

First, in step S31 shown in FIG. 4, it is determined whether the accelerator pedal is in the ON state (e.g., whether the opening degree of the accelerator pedal is greater than zero), or whether a brake switch 43 is in the OFF state.

When the result of the determination is "NO", the series of operations is terminated.

In contrast, when the result of the determination is "YES", the operation proceeds to step S32, in which it is determined whether the gear position is in the LOW position.

When the result of the determination in step S32 is "NO", the operation proceeds to step S33, in which it is determined that an in-gear operation, in which a gear position is selected, is being executed, and the series of operations is terminated.

In contrast, when the result of the determination in step S32 is "YES", the operation proceeds to step S34, in which a flag value "0" is set to the idling stop flag F_IDLESTOP, and the series of operations is terminated.

In other words, when the accelerator pedal is switched into the ON state, the idling stop operation is terminated, and the internal combustion engine 11 is operated depending on the opening degree of the accelerator pedal.

Moreover, when the brake is switched into the OFF state, the idling stop operation is terminated, and the internal combustion engine 11 is operated in order to produce the least amount of torque required for slow advance of the vehicle.

The operation for setting the lockup clutch control state LCZONE, to which a determination is made in step S03 explained above, will be explained below.

First, in step S41 shown in FIG. 5, it is determined whether the accelerator pedal is in the OFF state.

When the result of the determination is "NO", the operation proceeds to step S42, in which a cruise L/C control mode is set to the lockup clutch control state LCZONE, and the series of operations is terminated.

In contrast, when the result of the determination is "YES", the operation proceeds to step S43.

Note that the cruise L/C control mode means a control operation in which the lockup clutch 13 is set to be in the engaged state when the vehicle travels while the accelerator pedal is in the ON state.

In step S43, it is determined whether a lockup clutch operation command L/C, which will explained below, is set in the ON state. When the lockup clutch operation command L/C is set in the ON state, the lockup clutch 13 is to be engaged.

When the result of the determination is "NO", the operation proceeds to step S44, in which a normal deceleration control mode is set to the lockup clutch control state LCZONE, and the series of operations is terminated.

In contrast, when the result of the determination is "YES", the operation proceeds to step S45.

Note that the normal deceleration control mode means a control operation in which, for example, the lockup clutch 13 is set to be in the engaged state, whereby torque, which is equivalent to at least the friction loss of the operation of the internal combustion engine 11, is transmitted.

In step S45, it is determined whether the regenerative operation is permitted in the battery device side based on, for example, the remaining battery charge SOC and the temperature of the battery.

When the result of the determination is "NO", the operation proceeds to step S44 explained above.

In contrast, when the result of the determination is "YES", the operation proceeds to step S46, in which a deceleration regeneration control mode is set to the lockup clutch control state LCZONE, and the series of operations is terminated.

Note that the deceleration regeneration control mode means a control operation in which, for example, the lockup clutch 13 is set to be in the engaged state, whereby torque, which is equivalent to the sum of at least the friction loss of the operation of the internal combustion engine 11 and the regenerative operation of the motor 12, is transmitted.

The operation for setting the lockup clutch operation command L/C, to which a determination is made in step S43 explained above, will be explained below.

First, in step S51 shown in FIG. 6, it is determined whether the accelerator pedal is in the OFF state.

When the result of the determination is "YES", the operation proceeds to step S57, which will be explained below.

In contrast, when the result of the determination is "NO", the operation proceeds to step S52, in which a predetermined timer value is set to a subtraction delay timer, which is used when a fuel cut operation for the internal combustion engine 11 is to be executed.

In step S53, it is determined whether the vehicle speed V is equal to or greater than a predetermined cruise determination vehicle speed VGH/L having hysteresis.

Note that the cruise determination vehicle speed VGH/L is differently set depending on the ON/OFF state of an air conditioner device.

When the result of the determination in step S53 is "NO", the operation proceeds to step S54, in which an OFF state is set to the lockup clutch operation command L/C, and the series of operations is terminated.

In contrast, when the result of the determination in step S53 is "YES", the operation proceeds to step S55, in which it is determined whether the engine revolution rate NE is equal to or greater than a predetermined cruise determination engine revolution rate NEGH/L having hysteresis.

Note that the cruise determination engine revolution rate NEGH/L is differently set depending on the ON/OFF state of an air conditioner device.

When the result of the determination in step S55 is "NO", the operation proceeds to step S54 explained above.

In contrast, when the result of the determination in step S55 is "YES", the operation proceeds to step S56, in which an ON state is set to the lockup clutch operation command L/C, and the series of operations is terminated.

In step S57, it is determined whether the regenerative operation is permitted in the battery device (not shown) side based on, for example, the remaining battery charge SOC and the temperature of the battery.

When the result of the determination is "YES", the operation proceeds to step S61, which will be explained below.

In contrast, when the result of the determination is "NO", the operation proceeds to step S58, in which it is determined whether the timer value of the subtraction delay timer is "0".

When the result of the determination in step S58 is "NO", the operation proceeds to step S61, which will be explained below.

In contrast, when the result of the determination in step S58 is "YES", the operation proceeds to step S59, in which it is determined whether a fuel cut signal, which is used to execute a fuel cut operation for the internal combustion engine 11, is found.

When the result of the determination in step S59 is "NO", the operation proceeds to step S60, in which an OFF state is set to the lockup clutch operation command L/C, and the series of operations is terminated.

In contrast, when the result of the determination in step S59 is "YES", the operation proceeds to step S61, in which it is determined whether the vehicle speed V is equal to or greater than a deceleration regeneration determination first vehicle speed VGED which is differently set depending on whether or not regeneration is permitted (e.g., the VGED is set to 25 km/h when regeneration is permitted, and the VGED is set to 55 km/h when regeneration is not permitted).

When the result of the determination in step S61 is "NO", the operation proceeds to step S65, which will be explained below.

In contrast, when the result of the determination in step S61 is "YES", the operation proceeds to step S62.

In step S62, it is determined whether the engine revolution rate NE is equal to or greater than a deceleration regeneration determination first engine revolution rate NEGED which is differently set depending on whether or not regeneration is permitted (e.g., the NEGED is set to 1000 rpm when regeneration is permitted, and the NEGED is set to 1700 rpm when regeneration is not permitted).

When the result of the determination is "NO", the operation proceeds to step S65, which will be explained below.

In contrast, when the result of the determination is "YES", the operation proceeds to step S63.

In step S63, an ON state is set to the lockup clutch operation command L/C, the operation proceeds to step S64, in which it is determined whether an emergency brake is being applied by determining, for example, whether the decreasing rate of the engine revolution rate NE is equal to or greater than a predetermined value.

When the result of the determination in step S64 is "NO", and the series of operations is terminated.

In contrast, when the result of the determination in step S64 is "YES", the operation proceeds to step S60 explained above.

In step S65, it is determined whether the vehicle speed V is equal to or greater than a deceleration regeneration determination second vehicle speed VEM which is differently set depending on whether or not regeneration is permitted (e.g., the VEM is set to 20 km/h when regeneration is permitted, and the VEM is set to 40 km/h when regeneration is not permitted).

When the result of the determination is "NO", the operation proceeds to step S60 explained above.

In contrast, when the result of the determination is "YES", the operation proceeds to step S66, in which it is determined whether the engine revolution rate NE is equal to or greater than a deceleration regeneration determination second engine revolution rate NEEM which is differently set depending on whether or not regeneration is permitted (e.g., the NEEM is set to 900 rpm when regeneration is permitted, and the NEGED is set to 1200 rpm when regeneration is not permitted).

When the result of the determination in step S66 is "NO", the operation proceeds to step S60 explained above.

In contrast, when the result of the determination in step S66 is "YES", the operation proceeds to step S67.

In step S67, it is determined whether an ON state has been set to the lockup clutch operation command L/C in the previous control routine.

When the result of the determination is "NO", the operation proceeds to step S60 explained above.

In contrast, when the result of the determination is "YES", the operation proceeds to step S64 explained above.

In other words, the operation of the lockup clutch 13 when the accelerator pedal is in the OFF state is determined depending on whether or not the fuel supply to the internal combustion engine 11 is stopped, and depending on whether or not the regenerative operation is permitted, in particular, the lockup clutch 13 is set in the ON or OFF state depending on the vehicle speed V and the engine revolution rate NE when the regenerative operation is permitted, or when the regenerative operation is not permitted, but the fuel cut operation is requested.

When the vehicle speed V is equal to or greater than the predetermined deceleration regeneration determination first vehicle speed VGED and the engine revolution rate is equal to or greater than the predetermined deceleration regeneration determination first engine revolution rate NEGED, the lockup clutch 13 is set in the ON state.

Even when the vehicle speed V is lower than the predetermined deceleration regeneration determination first vehicle speed VGED, or the engine revolution rate is lower than the predetermined deceleration regeneration determination first engine revolution rate NEGED, if the lockup clutch 13 was set in the ON state in the previous control operation, the lockup clutch 13 is maintained in the ON state when the vehicle speed V is equal to or greater than the predetermined deceleration regeneration determination second vehicle speed VEM and the engine revolution rate is equal to or greater than the predetermined deceleration regeneration determination second engine revolution rate NEEM.

In a situation in which the input operation to the accelerator pedal is switched into the OFF state at time t1 and the vehicle speed V is gradually decreased as shown, for example, in part (a) of FIG. 7, first, the lockup clutch control state LCZONE is changed from the cruise L/C control mode to the deceleration regeneration control mode at time t1 as shown in FIG. 7(e).

When the engine revolution rate NE is gradually decreased after time t1 and the engine revolution rate NE reaches the highest engine revolution rate for the motor-driven oil pump operation NEEOPH as shown in part (b) of FIG. 7, the gear position is switched, for example, from the fourth gear position to the third gear position as shown in part (c) of FIG. 7. At the same time, the engine revolution rate is increased by a predetermined amount as shown in part (d) of FIG. 7.

Furthermore, when the engine revolution rate NE is again gradually decreased and reaches the lowest engine revolution rate for the motor-driven oil pump operation NEEOPL as shown in part (b) of FIG. 7, it is determined that the lockup clutch 13 cannot be set in the engaged state by the oil pressure produced by the mechanical oil pump 16 which is driven by the internal combustion engine 11; accordingly, the motor-driven oil pump 17 is operated as shown in part (f) of FIG. 7.

Moreover, when the vehicle speed V and the engine revolution rate NE are decreased and reach predetermined value #V1 and #N1, respectively, at time t4, the lockup clutch control state LCZONE is changed from the deceleration regeneration control mode to the normal deceleration control mode as shown in part (e) of FIG. 7, the motor-driven oil pump 17 is stopped, and the regeneration operation is stopped as shown in part (f) of FIG. 7.

As the vehicle speed V and the engine revolution rate NE are decreased, the gear position is changed, for example, from the third position to the LOW position at time t5 as shown in part (c) of FIG. 7, after that, when a flag value "1" is set to the idling stop flag F_IDLESTOP at time t6 as shown in part (d) of FIG. 7, and it is determined that the operation is in the idling stopped state, the motor-driven oil pump 17 is again started as shown in part (f) of FIG. 7. In other words, in order to prepare for the next starting of the internal combustion engine 11, oil pressure for controllably operating the torque converter 14 and the transmission 15 is ensured by the operation of the motor-driven oil pump 17 during the idling stopped state.

As explained above, in the control device 10 for a hybrid vehicle according to the present embodiment, even in a state, during deceleration of the vehicle, in which the lockup clutch 13 cannot be set in the completely engaged state by the oil pressure produced by the mechanical oil pump 16 which is driven by the internal combustion engine 11, the lockup clutch 13 can be controllably operated by the oil pressure produced by the motor-driven oil pump 17.

Because the electrical power required for driving the motor-driven oil pump 17 is much less than the regenerated electrical power produced by the regenerative operation of the motor 12, the efficiency of regeneration can be improved.

In addition, it is possible to ensure the oil pressure for controllably operating the torque converter 14 and the transmission 15 by operating the motor-driven oil pump 17 when the internal combustion engine 11 is in the idling stopped state.

Furthermore, it is possible to effectively operate the motor-driven oil pump 17 by changing the revolution rate of the oil pump 16, i.e., by changing the threshold (the motor-driven oil pump operation NEEOPL) which is used for determining the operation of the motor-driven oil pump 17 depending on the engine revolution rate NE, depending on the temperature of the transmission oil TATF; therefore, it is possible to improve the efficiency of regeneration even when, for example, the vehicle travels at low speed, or even when the temperature of the operation oil is high.

As explained above, according to the control device for a hybrid vehicle of the present invention, by operating the motor-driven oil pump when the vehicle decelerates, it is possible to ensure the oil pressure for operating the lockup clutch even when, for example, the vehicle travels at low speed, and it is possible to reduce the torque transmission loss in the torque converter when the driving power is transmitted from the drive wheels to the motor; accordingly, the efficiency of regeneration can be improved.

Moreover, according to the control device for a hybrid vehicle of the present invention, even when, for example, the lockup clutch cannot be set in the engaged state by the oil pressure produced by the mechanical oil pump, the regenerative operation control section can controllably operate the lockup clutch by means of the oil pressure produced by the motor-driven oil pump; accordingly, the efficiency of regeneration can be improved.

Furthermore, according to the control device for a hybrid vehicle of the present invention, the revolution rate measuring sensor for the internal combustion engine may be used to measure the input revolution rate of the torque converter; therefore, it is possible to measure the discharging pressure of the oil pump without further providing, for example, an oil pressure sensor.

Furthermore, according to the control device for a hybrid vehicle of the present invention, it is possible to effectively operate the motor-driven oil pump; accordingly, the efficiency of regeneration can be improved even when, for example, the vehicle travels at low speed, or even when the temperature of the operation oil is high.

What is claimed is:

1. A control device for a hybrid vehicle comprising:
    a transmitting section connecting at least one of an internal combustion engine and a motor to driving wheels via a torque converter having a lockup clutch;
    a motor-driven oil pump producing oil pressure for operating said lockup clutch;
    a regenerative operation control section which, when said vehicle decelerates, operates said motor-driven oil pump so as to set said lockup clutch in a lockup state, and which also operates said motor so as to generate regenerated energy;
    another oil pump which operates in synchronization with an input revolution rate of said torque converter, and which produces oil pressure for operating said lockup clutch;
    a determining section determining whether the discharging pressure of said another oil pump is equal to or less than a predetermined value,
    wherein said regenerative operation control section operates said motor-driven oil pump when it is determined by said determining section that a discharging pressure of said another oil pump is equal to or less than a predetermined value.

2. A control device as claimed in claim 1, wherein said determining section determines whether the discharging pressure of said another oil pump is equal to or less than a predetermined value by determining whether an output revolution rate of said another oil pump is equal to or less than a predetermined revolution rate.

3. A control device as claimed in claim 2, further comprising a threshold changing section which changes said predetermined revolution rate in accordance with a temperature of the operation oil for operating said lockup clutch.

4. A method of controlling operation of a lockup clutch for a torque converter in a transmitting section of a hybrid vehicle in which wheels are driven via said torque converter by at least one of an internal combustion engine and a motor, comprising the steps of:
    producing oil pressure for operating said lockup clutch by a motor-driven oil pump;
    determining a state of vehicle movement and operating said motor-driven oil pump to set said lock-up clutch in a lockup state when said vehicle decelerates to a predetermined level;
    providing another oil pump for producing oil pressure for said lockup clutch;
    operating said another oil pump in synchronization with an input revolution rate of said torque converter;
    sensing the discharging pressure of said another oil pump; and
    operating said motor-driven oil pump when the sensed discharging pressure of said another oil pump is equal to or less than a predetermined value.

5. The method of controlling operation of said lockup clutch according to claim 4 comprising the further step of:

determining the discharging pressure of said another oil pump by sensing the revolution rate thereof of said another oil pump.

6. The method of controlling operation of said lockup clutch according to claim 5 including the further steps of:

sensing the operating temperature of oil operating said lockup clutch; and changing said predetermined revolution rate of said another oil pump in response to the sensed operating temperature of said oil.

* * * * *